United States Patent [19]

Schatteman

[11] 4,212,438
[45] Jul. 15, 1980

[54] FAST REWIND MECHANISM FOR BIDIRECTIONAL TAPE TRANSPORTS FOR CASSETTES

[75] Inventor: Etienne A. M. Schatteman, Wemmel, Belgium

[73] Assignee: Star S.A., Brussels, Belgium

[21] Appl. No.: 906,311

[22] Filed: May 16, 1978

[30] Foreign Application Priority Data

May 18, 1977 [FR] France .................. 77 15380

[51] Int. Cl.² ........................................... G11B 15/30
[52] U.S. Cl. ............................................... 242/201
[58] Field of Search ............... 242/201, 202, 203, 204, 242/198; 360/96

[56] References Cited

U.S. PATENT DOCUMENTS

| | | | |
|---|---|---|---|
| 3,997,129 | 12/1976 | Ban et al. | 242/201 |
| 4,031,554 | 6/1977 | Umeda et al. | 242/201 |
| 4,089,487 | 5/1978 | Ichikawa et al. | 242/201 |

*Primary Examiner*—George F. Mautz
*Attorney, Agent, or Firm*—Leydig, Voit, Osann, Mayer & Holt, Ltd.

[57] ABSTRACT

A bidirectional tape transport for tapes stored in cassettes providing fast forward and fast rewind functions. Fast forward and rewind are achieved by actuating controls which increase the motor speed and also release the tape from a capstan drive and the playback and recording head so that it may move freely at the fast speed. For fast rewind, the polarity of the supply voltage to the motor is reversed and those components of the bidirectional drive and the drive train to the reel spindles are reversed in such a way as to drive the supply spindle. Such operations are achieved by energizing a single solenoid by means of an electrical pulse produced by a switch actuated by the fast rewind control. The switch is so positioned that it will be actuated once during the advance stroke as the fast rewind control is pressed and once in the return stroke of the control. The operation of the fast rewind control thus induces successively two operations of the solenoid and two successive changes in the direction of movement of the tape, independently of its initial direction of movement. The fast forward and rewind functions are related to the direction the tape is moving at normal speed when the fast controls are actuated.

9 Claims, 9 Drawing Figures

FAST REWIND MECHANISM FOR BIDIRECTIONAL TAPE TRANSPORTS FOR CASSETTES

The present invention relates to magnetic tape recording and playback apparatus, and more particularly to tape transports for magnetic tape recording and playback apparatus providing bidirectional movement of the tape at normal speed, and fast forward and fast rewind functions.

In prior tape transports for recording and playback apparatus for tape cassettes, more particularly such tape transports with bidirectional drives, various types of fast forward and fast rewind drives have been employed. With one type, the "forward" and "rewind" directions are always the same and are not related to the direction of tape movement at the moment the controls are actuated; with this type of fast drive, the operator must determine the direction of tape movement at normal playing speed in order to determine which control to actuate to back-up the tape or to advance the tape at the fast speed.

Recognizing the advantage of having the fast forward and rewind direction related to the direction of tape movement at normal speed, it has been proposed to include means for sensing tape movement at normal speed and such a mechanism is shown in Staar U.S. Pat. No. 3,758,049, which includes means for sensing the direction of tape movement at normal playing speed when the fast speed controls are actuated and relates the fast forward or rewind function to the direction of tape movement at that moment. With such a sensing means, the problem with determining the direction of tape movement at normal playing speed is overcome.

Widespread commercial use has been made of bidirectional tape transports equipped with automatic stop systems of the kind shown in Schatteman U.S. Pat. No. 3,488,017 which detect from the rotational movement of the reels that the tape in a cassette has been completely transferred from one reel to the other; that is, the tape has been completely unwound from one of the reels and the end of the tape has been reached in one of the directions of movement, when the reels stop rotating. Such automatic stop systems have been used to stop the drive and eject the cassette at the end of the tape in one direction of movement, and have been employed with bidirectional drives to reverse the drive and eject the cassette after the end of the tape has been reached in the second direction of movement, so that both recording tracks have been recorded or played back. To stop the drive, or to carry out other functions, Schatteman U.S. Pat. No. 3,488,017 utilizes a solenoid energized by a pulse of current derived from electrically powered reel rotation detection and switching circuits. It is now proposed to employ the same solenoid utilized for reversing the bidirectional normal speed drive, for reversing the direction of tape movement for fast rewind, and thereby relate the rewind direction of movement to the direction the tape is moving at normal speed when the rewind controls are actuated; it is also proposed to achieve the fast forward movement of the tape by utilizing a system like that disclosed in Staar, U.S. Pat. No. 3,862,729, where a fast forward function is achieved by a manually operable switching device to connect the drive motor for the tape transport to a source of power which operates the motor at a higher speed and employs a direct drive means for the take-up reel spindle.

However, while said Staar U.S. Pat. No. 3,862,729 discloses only a fast forward function, an important object of this invention is to provide a bidirectional tape transport for movement of the tape at normal playing speed, which also includes provision for both fast forward and fast rewind by connecting the drive motor for the tape transport to a source of power which operates the motor at a higher speed and employs direct drive means selectively engaged to operate the take-up spindle according to the direction of tape movement desired.

According to a simplified embodiment of the invention, the tape is driven in the reverse direction at either normal speed or fast speed by reversing the polarity of the supply voltage to the tape transport drive motor. The invention has more general applicability, however, to tape transports wherein the the drive motor always rotates in the same direction and reversal at normal speed is obtained by using oppositely rotating capstans and reversing those components of the bidirectional drive in the drive train to the reel spindles, in such a way as to drive the take-up spindle. It is a general object of the invention to provide bidirectional tape transports which employ electrically powered means (such as a solenoid) for reversing the drive responsive to an electrical pulse, with a fast rewind function initiated by fast rewind controls which operate the same electrically powered means to reverse the bidirectional drive and also achieve the desired fast tape speed. It is a further objective to return the unit to normal speed in the original direction of tape movement responsive to release of the fast rewind controls, by carrying out two successive changes in the direction of movement of the tape, independently of its initial direction of movement.

Accordingly, broadly stated, the principal object of the invention is to provide a bidirectional tape transport mechanism for driving a tape from reel to reel of a cassette, with a capstan drive providing constant playback or recording speed, and with direct drive of the reels providing fast forward and rewind speeds, and wherein operation of the fast forward and rewind controls disengage the capstan drive, increase the motor speed, and engage the direct drive to relate the direction of tape movement at fast speed according to which control has been actuated "forward" or "rewind", regardless in which direction the tape happens to be moving at normal speed when the fast rewind controls are actuated.

The present invention has particular utility in systems which include automatic reverse of bidirectional drives in response to a signal representing the tape in moving from one reel to the other within the cassette has reached the end -- a system for producing such a signal is shown and described in Schatteman U.S. Pat. No. 3,488,017. Other systems are known which sense tape tension or detect the stopping of the movement of the reel hubs, and the present invention is applicable generally to bidirectional drives reversed by a signal representing the end of the tape and is not limited to the specific embodiment disclosed.

Further objects will become apparent from the following description taken in connection with the accompanying drawings in which:

FIG. 4 is a plan view of the tape deck shown in FIG. 3 with components removed to reveal the belt drive to the flywheels and the direct drive train to the reel spindles operative to drive the reel spindles at fast speed;

Figure 1:
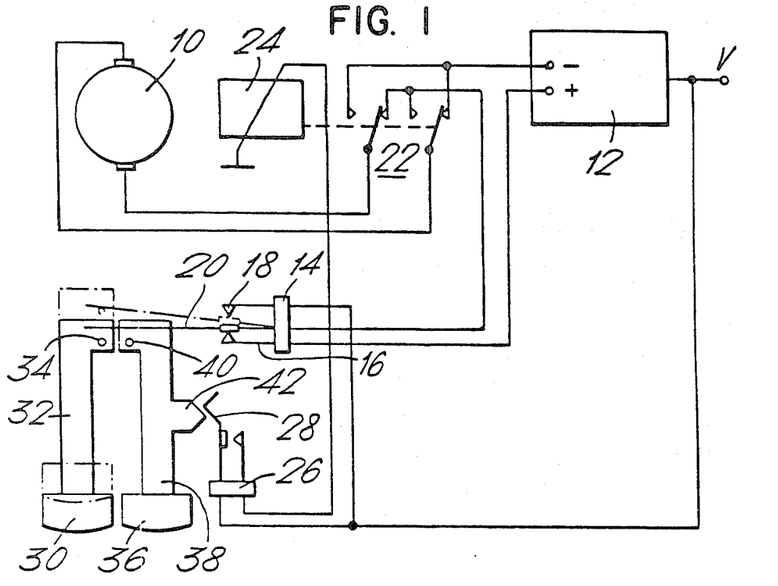
FIGS. 1 and 2 are schematic circuit diagrams illustrating an exemplary embodiment of the present invention, in which fast forward and rewind functions are achieved by actuation of controls.
Figure 2:
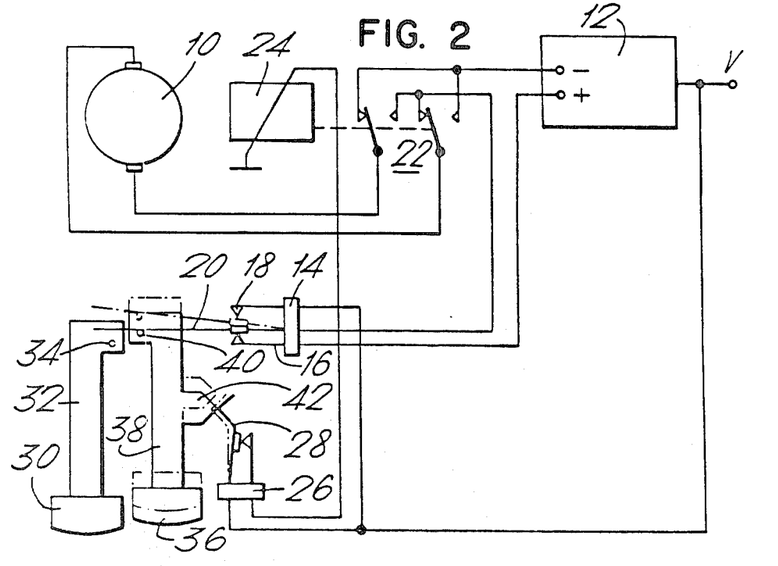

Turning now to FIGS. 1 and 2, a simplified exemplary embodiment of the invention is disclosed in these schematic circuit diagrams.

In this embodiment, the fast speed drive of the magnetic tape is effected by increasing the voltage supplied to the terminals of the electric motor 10 by which the tape is driven, while the reversal of the direction of the tape movement at either normal or fast speed is carried out by reversing the polarity of the voltage supplied to said motor.

Under normal operating conditions the electric motor 10 driving the capstan or capstans and the reels (not shown in the drawing) is supplied with power from a speed regulating circuit 12 known per se. This circuit 12 is connected to a voltage source V which may, for example, be of 12 volts and drops the voltage from 12 volts to a lower voltage and maintains the lower voltage constant so as to operate the motor 10 at a speed which through, preferably, a capstan drive transports the magnetic tape at a constant normal speed during the recording and playback operations.

A change speed switch 14, with two terminals 16 and 18 and a movable contact 20, is connected between the motor 10 and the circuit 12. This change-speed switch connects the motor 10 either to the circuit 12 which supplies the lower voltage or directly to the higher voltage source V, according to whether the movable contact 20 is applied against the terminal 16 or against the terminal 18. In its normal position shown in FIG. 1, the switch 14 connects the motor to the lower voltage source 12.

Between the motor 10 and the change-speed switch 14 there is also an inverter-switch 22 which is actuated by a solenoid 24 and which serves to reverse the polarity of the motor 10. The motor 10, therefore, rotates in one direction or in the other according to whether the inverter-switch 22 occupies the position shown in FIG. 1 or that shown in FIG. 2. The solenoid 24 when energized shifts the inverter switch from one state to the other.

The "fast forward" speed of the motor 10 is achieved similarly to that described in Staar U.S. Pat. No. 3,862,729, in response to forward movement of a pushbutton or key 30 and a slide bar 32 bearing a lug 34. When the slide bar is moved from its home position shown by full lines in FIG. 1 to its operative position shown in dot-and-dash lines in FIG. 1 the lug 34 adjusts the movable contact 20 from its position of rest shown in full lines to the position shown in dot-and-dash lines. This operation, thanks to the contact at the terminal 18, by-passes the circuit 12 and connects the motor 10 directly to the higher voltage V, to accelerate the motor in the direction of rotation in which it was running previously.

In keeping with one aspect of the present invention, the "fast rewind" speed of the motor 10 is likewise achieved by forward movement of a button or key 36 (as shown in FIG. 2) and a slide bar 38, again bearing a lug 40. The function of the lug 40 is the same as that of the corresponding lug 34 on the slide bar 32, to engage the movable contact 20 with the contact 18 and connect the motor to the voltage V. Key 36 also reverses the motor 10, by means of the cam 42 which acts on the movable contact 28 of the switch 26 situated in the circuit for the solenoid 24.

When the fast rewind key 36 is actuated, the slide bar 38 is caused to move (see FIG. 2), and in the first part of its travel (see position indicated in full lines) the cam 42 acts on the contact 28, thereby generating an electrical pulse which energizes and shifts the state of the solenoid 24. The inverter switch 22 is moved from the position shown in FIG. 1 to that shown in FIG. 2, which reverses the polarity of the voltage supplied to the motor and the direction of rotation of the motor. In the second part of the travel of the slide bar 38, the lug 40 acts on the movable contact 20 (see position indicated in dot-and-dash lines in FIG. 2), so that the full voltage V is applied to the terminals of the motor in order to drive the tape at a high speed. The "fast rewind" key 36 thus is shown in dot-and-dash lines in its operative position, to cause the tape, whatever the direction of movement prior to the operation of this key, to move in the opposite direction and at a high speed.

When the "fast rewind" key 36 is released the lug 40 retracts and allows the movable contact 20 to re-engage the contact 16 of the change-speed switch 14. This causes the motor and thus the tape to be once again driven at the normal speed. In the course of the return movement of the slide bar 38, the cam 42 again acts momentarily on the fast rewind switch 26, thus energizing and shifting the state of the solenoid 24 and returning the inverter switch 24 to the position shown in FIG. 1, again reversing the direction of movement of the drive motor 10 and the tape. The tape moves at the normal speed and in the direction which prevailed before the user had operated the fast rewind drive mechanism.

In the embodiment of the invention described, the solenoid 24 reverses the polarity of the power source connected to the motor, but the invention may be utilized to effect the reversal, by mechanical means, of the direction of movement of the tape, while the motor driving the capstans and reels continue to turn in the same direction. The reversal of the polarity of the motor can also be effected by an entirely electronic device instead of by a relay.

It will also be observed that the direction of movement of the magnetic tape is reversed by means of the key 36, and the rapid tape movement may be forestalled by pressing the key 36 until the closure of the contact 38 takes place, which will cause the reversal of the direction of drive, care being taken not to move the slide bar 38 beyond this position, the emission of more than one pulse thus being avoided. In particular, the slide bar 38, for example, can be given an intermediate position, e.g., by means of a mechanical resistance, as a simple means of determining the moment when the cam 42 will actuate the contact 28 once only and of preventing it from being actuated twice, i.e. once on the forward movement and once on the return movement.

Figure 3:
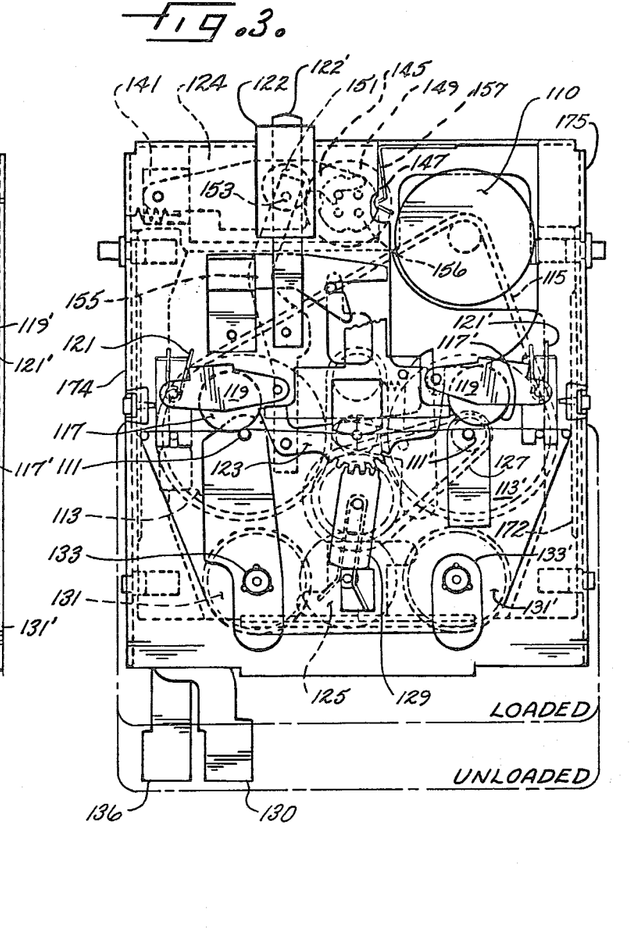
FIG. 3 is a plan view of a tape deck incorporating a preferred embodiment of the present invention and illustrates a bidirectional tape transport with the drive engaged to move the tape from reel to reel within a cassette in one direction at normal speed.
Figure 8:
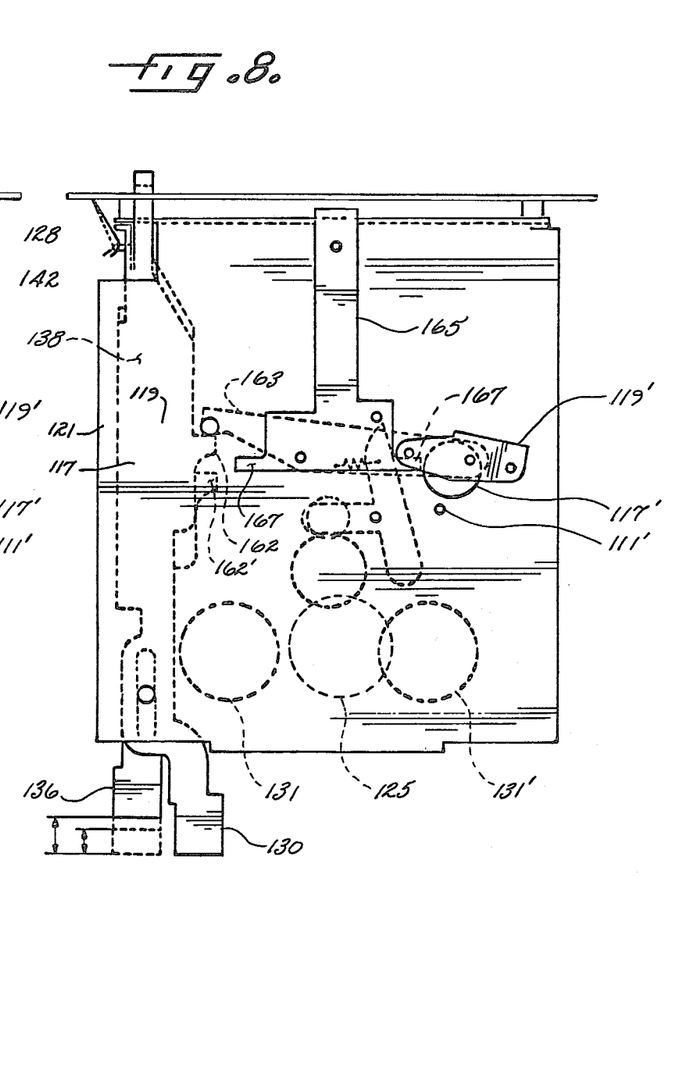
FIG. 8 is a plan view of the tape deck shown in FIG. 3 with components removed to reveal, as in FIG. 7, the capstan drive and the direct drive to the reel spindles for fast speed function, and illustrates the fast rewind pushbutton after actuation and the fast rewind drive engaged and the capstan drive disengaged in response to the actuation of a fast rewind pushbutton.
Figure 9:
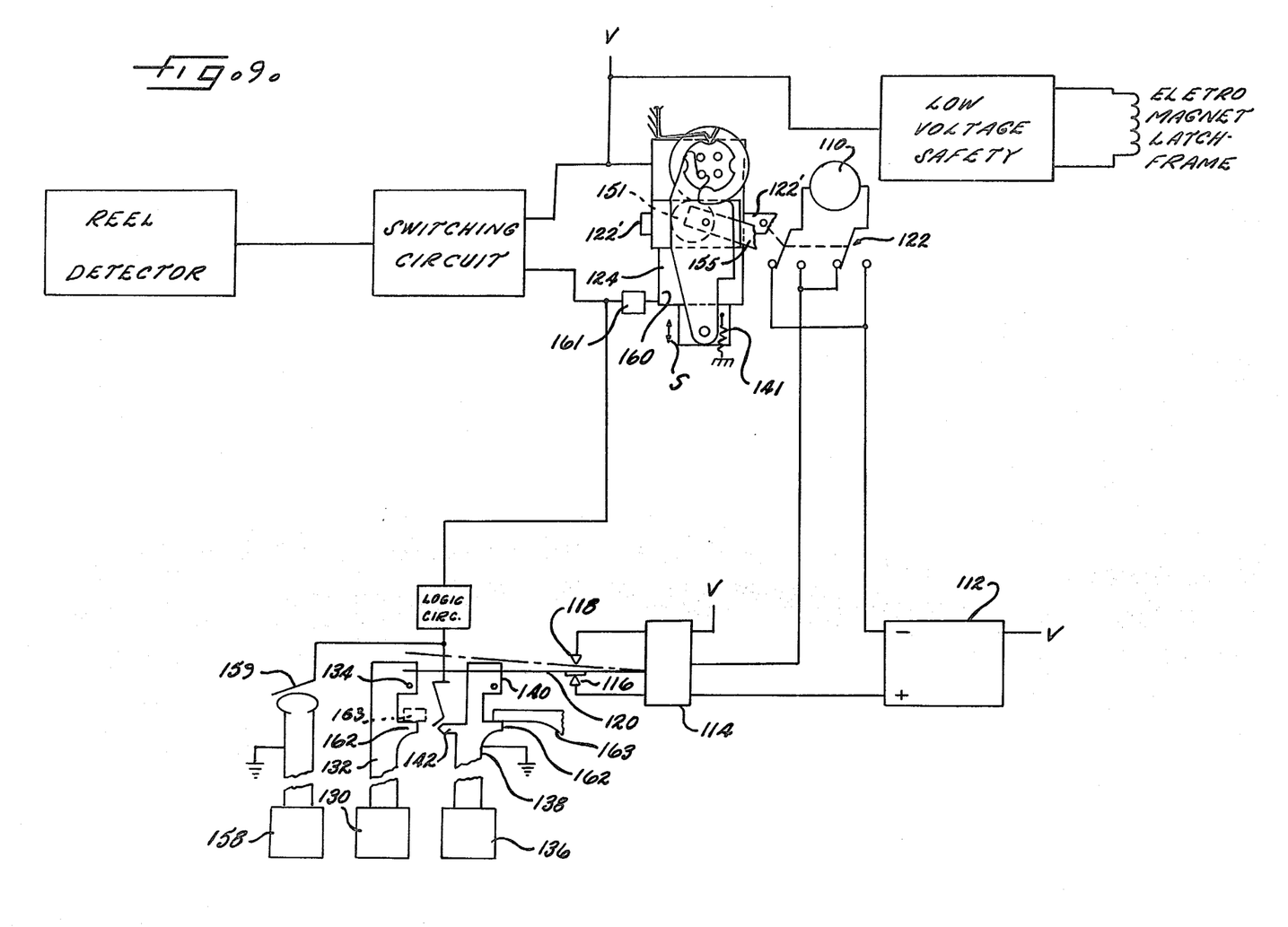
FIG. 9 is a schematic circuit diagram of a preferred circuit embodying the present invention and illustrating the switch means for reversing the polarity of the voltage supplied to the tape transport drive motor and, in diagrammatic manner, the pawl mechanism for reversing the bidirectional tape transport.

Now turning to FIGS. 3–9, an alternative, preferred embodiment of the invention is illustrated in these Figures, which show a playback and recording apparatus for tape cassettes, with a bidirectional tape transport embodying fast forward and rewind functions. FIG. 9 is a diagrammatic drawing of a circuit including the electrically powered components of the apparatus components illustrated in FIGS. 3–8, and the controls therefor, and includes the components corresponding to those shown in FIGS. 1 and 2 as well as other circuit components of the apparatus embodying the preferred form of the invention. Thus, while in the embodiment of the invention illustrated in FIGS. 1 and 2, the bidirectional tape transport is not shown for moving the tape at normal playing speed, the tape transport is included in the apparatus depicted in FIG. 3. The tape transport drive motor 110, as shown in FIG. 9, is supplied with a lower voltage for operating the tape at normal playback or recording speeds from a voltage and speed regulating circuit 112, and at a higher voltage V by shunting the circuit 112 when the fast forward and fast rewind functions are achieved. Referring to FIG. 3, the motor 110 drives the tape through a capstan drive, the capstans 111, 111' being carried on flywheels 113, 113' which are both driven in the same direction by a continuous belt 115. With the tape transport components in the position shown in FIG. 3, the motor 110 is rotating the flywheels and captans counterclockwise. The capstan drive includes a pair of pinch rollers 117, 117' supported on pivotal mountings 119, 119'. One pinch roller 117 is engaged with its capstan 111 and pinches the tape. With the capstan drive engaged as shown in FIG. 3, the movement of the tape is from right to left in that Figure. The other pinch roller 117' is disengaged from its capstan 111' by the lever 123, which releases the engaged pinch roller 117 to the action of its spring 121.

The lever 123 also engages direct drive means with the take-up reel spindle related to the direction of tape movement determined by the engaged capstan drive. Since both capstans rotate in the same direction, to reverse the direction of tape movement the motor is reversed and the drive is shifted from one capstan to the other, and the direct drive for the reel spindles is also shifted so that what was originally the non-driven supply or take-off reel becomes the driven take-up reel. Referring to FIG. 3, with the motor and flywheels rotating in the counterclockwise direction, and the tape movement being from right to left in the Figure, the left hand reel spindle 133 serves as the take up reel spindle and is driven through an intermediate gear 125. The intermediate gear 125 is driven from one of the flywheels 113' by means of another belt and pulley system 127 and a gear 129 which meshes with and drives the intermediate gear 125. The intermediate gear 125 is movably mounted on the fixed frame to shift from engagement with a gear 131 operating the take-up spindle 133 (the left hand reel spindle in FIG. 3), to a position of engagement with the gear 131' operating the other reel spindle (see FIG. 6). The shifting of the intermediate gear 125 from direct drive engagement with the reel spindle gear 131 or 131' is carried out by movement of the lever 123 which rocks about a supporting shaft from the position shown in FIG. 3 to that illustrated in FIG. 5. To transmit the rocking motion of the lever 123 to the intermediate gear 125, the lever 123 bears a gear segment 135 which meshes with a gear segment on an arm 137 which rotates freely on an axis 137'. The arm 137 carries a fork 139 which engages the shaft (FIG. 3) of the intermediate gear 125 and moves the gear 125 from engagement with one of the gears 131 or 131' to the other (See FIGS. 4,5). The rocking movement of the lever 123 is utilized, therefore, to engage both the capstan drive and take-up spindle drive for one direction of tape movement, while disengaging the other capstan drive and direct drive to the other reel spindle.

For rocking the lever 123 from one position to the other, the present invention provides a solenoid 124 and means for transmitting the movement as the solenoid plunger 141 pulls in to the lever 123, herein shown as a pawl and crank mechanism.

Figure 4:
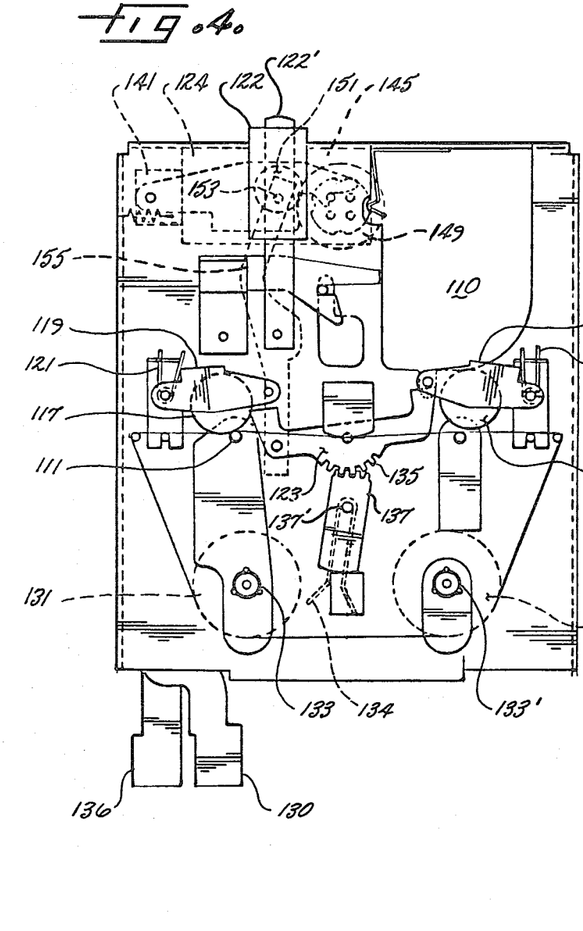
FIG. 4 is a plan view of the tape deck shown in FIG. 3, with components removed to reveal the capstan drive and the elements for shifting the direct drive to the take-up reel spindle, and elements for reversing the bidirectional tape transport mechanism.
Figure 5:
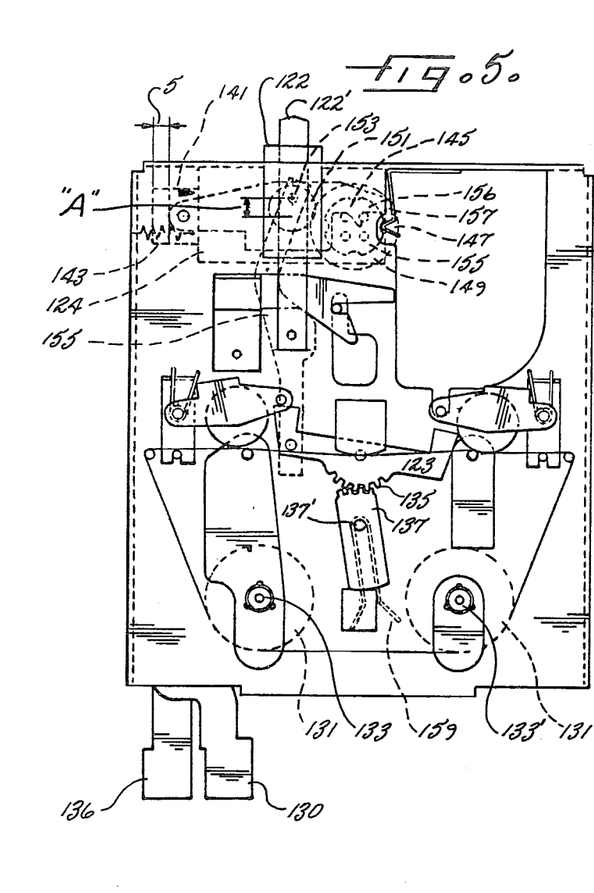
FIG. 5 is a plan view similar to FIG. 4, with the bidirectional tape transport after having been shifted to reverse the direction of movement of the tape from the direction depicted in FIG. 4.

Referring to FIG. 5, the pull in stroke of the solenoid plunger 141 from left to right is indicated at "S" as well as its return spring 143. When the solenoid 124 is energized its plunger 141 drives a pawl 145 from left to right which acts on one of four pins 147 carried by a gear 149. One forward stroke of the plunger 141 of the solenoid 124 rotates the gear 149 clockwise for a quadrant, and the pawl 145 returns, lifts and drops back down to its position behind the upper left most pin 147 as illustrated in FIG. 3 ready for the next stroke of the solenoid to rotate the gear 149 its quarter turn. Rotation of the gear 149 through one quadrant rotates a crank gear 151 180°, which rotates a crankpin 153 180° and moves the connecting rod 155 to the lever 123, the distance A to rock the lever 123 from one of its extreme positions, shown for example in FIGS. 3 and 4, to the other of its extreme positions, shown for example, in FIG. 5. In its transition from the position of FIG. 3 to FIG. 5, the lever 123 not only shifts the intermediate gear 125 so as to drive the reel spindle 133' (See FIG. 6) but also disengages the left hand pinch roller 117 from its capstan 111, and allows the right hand pinch roller 117' under the urging of its spring 121' to engage its capstan 111'. A disc 156 with four recesses in its edge is fixed to turn with the pawl driven gear 149 and a detent 157 on the main frame engages in the recesses to hold the gear 149 against movement between operations of the pawl.

Referring to FIGS. 3, 4 and 9, the reversal of the polarity of the supply voltage to the motor 110 is insured by a slide switch 122 one part of which 122' is driven by the connecting rod 155. Each time the solenoid 124 is operated, the crank gear 151 moves the connecting rod 155 and thus the slider 122' from one position to the other to reverse the direction of rotation of the motor and reverse the direction of movement of the tape through the bidirectional tape transport, which involves shifting the direct drive from one reel spindle to the other so that the take-up spindle in the new direction of tape movement is operated by the drive motor through the direct drive means including the intermediate gear 125.

To energize the solenoid 124 and reverse the bidirectional drive, means are provided to complete a circuit from the power source V through the winding of the solenoid 124, herein shown as a reverse pushbutton 158 in FIG. 9 which when actuated engages the contact 159 and effectively grounds that contact and thus the terminal 160 of the solenoid 124, through any means desired such as a switching transistor 161. With the solenoid terminal grounded, a circuit is made through the solenoid winding from the voltage source V and the solenoid is energized to pull in its plunger 141. The operation of the reverse pushbutton also, as diagrammatically illustrated in FIG. 9, operates the pawl 145 and crank mechanism (149, 151, 153) to shift the bidirectional drive and to invert the polarity of the voltage supplied to the motor 110 so that the capstan drive is engaged to move the tape in the new direction at normal speed, and the take-up reel spindle related to the new direction of tape movement is directly driven and the take-off spindle left relatively free to rotate.

In accordance with the present invention, the tape playback and recording apparatus shown in FIGS. 3–9 in addition to providing means for reversing the direction of tape movement at normal speed, also provides selectively operable means for reversing the direction of tape movement and moving the tape at high speed to achieve a fast rewind function. As herein shown, referring again to FIG. 9, operation of a fast rewind pushbutton 136 first engages the contact 128 and with the pushbutton mechanism being grounded, thus effectively drops the potential of the solenoid terminal 160 to zero and energizes the solenoid by completing a circuit through the solenoid winding from the voltage source V. The inverter switch 122 is shifted from one position to the other by the operation of the solenoid 124, reversing the bidirectional drive and the polarity of the voltage applied to the motor 110 thus reversing its direction of operation.

The solenoid 124 operates to reverse the bidirectional drive and disengage the engaged capstan drive by lifting the active pinch roller from its capstan. Thus, if the tape transport mechanism was in the position of FIG. 3 when the fast rewind pushbutton was actuated, the reversing contact 128 is engaged which causes the solenoid 124 to be operated. This results in the position of the inverter switch 122 and bidirectional drive to be changed by the pulling in of the solenoid plunger 141, and the bidirectional drive components being shifted from the position of FIG. 3 to the position of FIGS. 5 and 6.

As indicated in FIG. 8, in the course of the movement of the fast rewind pushbutton 136 from its home position to its fully pressed in position, it moves through an intermediate position where its lug 142 acts momentarily on the contact 128 for ensuring a reverse operation. In the second part of the travel of the rewind pushbutton, the lug 140 acts on the movable contact 120 of a change speed switch 114 which is in the circuit between the voltage and speed regulating circuit 112 and the inverter switch 122. When the fast rewind pushbutton is pushed fully in, the movable contact 120 is raised to its position indicated in dot-and-dash lines in FIG. 9, so that the full voltage V is connected to the inverter switch 122 and thereby to the terminals of the motor 110. The holding of the fast rewind button fully pressed in maintains the high speed movement of the motor and the rewind movement of the tape. When the fast rewind pushbutton is released, the lug 140 retracts and allows the movable contact 120 to re-engage the contact 116 of the change speed switch 114. This causes the motor and thus the tape to be once again driven at the normal speed. In the course of the return movement of the fast rewind pushbutton to its home position, the lug 142 again acts momentarily on the reversing contact 128, thus again connecting one terminal 160 of the solenoid to ground and completing the circuit through the solenoid windings to the supply voltage V, thus energizing the solenoid 124. This pulls in the solenoid plunger 141, returning the inverter switch 122 to its original position, and via the pawl 145 and crank mechanism again shifting the bidirectional drive to reverse the direction of movement of the drive motor 110 and the tape. Thus, the tape is moved at the normal speed and in the original direction which prevailed before the user had operated the fast rewind drive mechanism.

The rewind pushbutton 136 (see FIGS. 7 and 8) is also operative in the final portion of its inward movement, to fully disengage the capstan drive from the tape and shift the recording and playback head on the main frame in a direction away from the tape, so that the tape of the cassette is freed for movement at high speed without interference or frictional engagement with those parts of the tape transport. For this purpose, a lug 162 on the edge of the pushbutton slide bar 138 engages a lever 163 which is pivotally mounted on the main frame and is pinned to a t-bar 165 slidably mounted on the main frame. The t-bar 165 has a pair of laterally projecting lugs 167, 167' which are operative to raise the pinch rollers 117, 117' away from the capstans. As shown in FIG. 8, the terminal portion of inward movement of the rewind pushbutton 136 lifts the lever 163 from the position of FIG. 7 to the position shown in FIG. 8, and in the course of that movement slides the t-bar 165 in a direction away from the tape of the cassette. The laterally projecting lug 167 on the t-bar 165 has engaged a pin on the righthand pinch roller mounting 119' and raised the roller 117' away from its capstan 111'. The recording and playback head (not shown) may be mounted directly on the t-bar 165 and move with the t-bar away from the tape.

For achieving the fast forward function, the preferred embodiment illustrated in FIGS. 3–9 provides a fast forward pushbutton 130 having a lug 134 which upon forward movement of the fast forward pushbutton 130 engages the movable contact 120 of the change speed switch 114, and lifts the contact 120 to a position of engagement with the contact 118, thereby connecting a source of voltage V via the switch 122, to the windings of the motor 110 and raising the speed of the motor to fast speed. In order to disengage the capstan drive and the recording and playback head from engagement with the tape, the slide bar 132 of the fast forward control actuated by the pushbutton 130 carries a lug 162' (FIG. 8, 9), which upon movement of the fast forward pushbutton 130 to its fully pressed in position engages the lever 163 and pivots the lever so as to shift the t-bar 165 and the mounting for the engaged pinch roller 117, 117' to shift the pinch roller away from that one of the capstans 111,111' with which the active pinch roller is engaged at the moment the fast forward control pushbutton 130 is actuated. It will also be observed that a similar sequence of operation of components of the tape transport is followed responsive to the actuation of the fast forward control as with actuation of the fast rewind control; that is, the first portion of the inward movement of either fast control pushbutton disengages the capstan drive and shifts the head from the tape, while the last portion of the inward movement actuates the change speed switch to increase the speed of the motor 110 and the rotational speed of the take-up reel in the direction of movement "forward" or "rewind" designated by the pushbutton which has been actuated.

The tape transport mechanism employed in the preferred embodiment of the invention is preferably of the parallel frame type shown in Staar U.S. Pat. No. 3,385,534, having a movable frame 172 supported on and maintained parallel with a fixed frame 170 comprised of a cross-member 171 on which components of the bidirectional drive are mounted such as the pinch rollers 117, 117' and their supports 119, 119', and the solenoid 124 of the reversing means for the bidirectional drive herein shown as including the crank gear 151, connecting rod 155 and lever 123. Cassettes are insertable into the unit by the operator and moved from unloaded to loaded positions indicated in FIG. 3, by sliding the cassette in fixed guides (not shown) on the fixed frame which constrain the movement of the cassette to substantially a single, lateral plane from its unloaded to its loaded positions. Components of the bidirectional drive, including the motor 110, capstans 111, 111', and reel drive spindles 133, 133' as well as the belt-pulley and gear drives from the motor to these components, are supported on the movable frame 172 (FIGS. 3, 6) which is carried on side members 174, 175 of the fixed frame 170, beneath and spaced from the cross-member 171. The movable frame 172 is movable together with the cassette and also moves perpendicularly toward the main face of the cassette from its initial spaced position below the cross-member 171, which maintains the capstans 111, 111' and reel drive spindles 133, 133', which project upward from the movable frame 172, in alignment with openings in the cassette in the course of the movement of the cassette from unloaded to loaded positions, and causes such tape and reel drive elements to penetrate the cassette openings and operatively engage the tape and reel hubs as the cassette reaches its loaded position.

The movable frame 172 is mounted on side frame members 174, 175 of the fixed frame for movement with a cassette, and perpendicularly relative to the fixed frame, as the cassette is inserted and moved by an operator from unloaded to loaded positions. The mounting means may have the parallelogram linkage construction illustrated in U.S. Pat. No. 3,385,534 or it may have a set of projecting lugs slidable in inclined slots formed in the side frame members of the fixed frame as shown in said patent.

The movable frame 172 is maintained parallel with the fixed frame as it moves perpendicularly relative to the fixed frame, in order that those components of the bidirectional drive, such as the capstans and reel drive spindles which are on the movable frame, penetrate the openings of the cassette and are brought into operative engagement with the tape and reel hubs, as the cassette moves to the loaded position. Such movement of the movable frame also brings the intermediate gear 125 which is on the movable frame, into operative relation with the fork 139 of the reversing means which is on the fixed frame, so as to permit the elements of the reversing means on the fixed frame to reverse the intermediate gear and those elements of the bidirectional drive carried on the movable frame, to change the direction of movement of the tape.

I claim as my invention:

1. In a recording and playback apparatus for tapes stored in cassettes, having a bidirectional drive for transporting the tape from reel to reel of a cassette in either direction at normal speed, including drive means for both the reels engageable with the take-up reel in the direction of tape movement at normal tape playback or recording speed, and means including an electrically powered device operable in response to an electrical pulse for reversing said bidirectional drive and coincidentally engaging said drive means with the supply roll; the improvement comprising:
   manually actuable fast forward and fast rewind control elements;
   means for increasing the speed of said drive means in response to the actuation of either said control elements; and
   circuit means including a switch operated responsive to the actuation only of said fast rewind control element for producing an electrical pulse and conducting said pulse to operate said electrically powered device to reverse said bidirectional drive and coincidentally engage said drive means with the supply reel, to transport the tape from reel to reel in the reverse direction at fast speed regardless of the original direction of tape movement at normal speed when the fast rewind control is actuated.

2. In a recording and playback apparatus for tapes stored in cassettes, the improvement according to claim 1 wherein
   said switch is operated twice in response to the actuation and release of said fast rewind control element for operating said electrically powered means to reverse said drive means again and shift said drive means from said supply reel to said take-up reel to resume the original direction of tape movement, and
   wherein the speed of said drive means is decreased to normal speed in response to the release of said fast rewind control element.

3. In a recording and playback apparatus for tapes stored in cassettes, the improvement according to claim 1 wherein
   means is included to operate said device in response to the release after actuation of said fast rewind control element to reverse said bidirectional drive again and to shift said drive means from engagement with said supply reel to said take-up reel to resume the original direction of tape movement, and
   wherein the speed of said drive means and take-up reel is decreased to normal speed in response to the release of said fast rewind control element.

4. In a recording and playback apparatus for tapes stored in cassettes having a bidirectional tape transport mechanism for driving the tape from reel to reel of a cassette at normal tape playback or recording speed, and electrically powered means operable to reverse said drive means and the direction of tape movement and to shift said drive means to the take-up reel in the direction of tape movement; the improvement comprising:
   fast forward and fast rewind control elements;
   means for increasing the speed of said drive means and driving the tape at fast speed in response to the actuation of either said control elements; and circuit means connected to a power source and said electrically powered means including switch means actuated by said fast rewind control element to connect said source to operate said electrically powered means to reverse direction at fast speed regardless of the original direction of tape movement at normal speed when the fast rewind control is actuated.

5. In a recording and playback apparatus for tapes stored in cassettes having a bidirectional tape transport mechanism for driving the tape from either of the two reels to the other by driving the take-up reel at normal speed, means for reversing the direction of movement of the tape responsive to an electrical pulse, and means for operating said reel driving means at fast speed; the improvement comprising:

a fast rewind control element movable from a first position, corresponding to normal tape speed, to a second position, corresponding to the fast speed of the tape; and circuit means including a switch operated in the course of movement of said control element in both directions between said positions, at a point intermediate between said positions, for generating an electrical pulse and transmitting said pulse to said reversing means to reverse the direction of movement of the tape.

6. The improved apparatus as defined in claim 5, wherein fast speed tape movement is initiated by said means for operating said reel driving means at fast speed responsive to the movement of said fast rewind control element from its first position to its second position, said control element comprising a slide bar having a lug, and said operating means including a fast speed switch engaged by said lug in the course of said movement of said fast rewind control element.

7. The improved apparatus as defined in claim 6, wherein said slide bar of said fast rewind control element further includes a member for operating said switch at said intermediate point between said two positions.

8. The improved apparatus as defined in claim 5, wherein said means for driving the take-up reel is operated by a reversible electric motor, and wherein said reversing means includes an inverter switch in the power supply circuit of the motor for reversing the polarity of the voltage applied to the motor for reversing the motor, and a solenoid connected to actuate said inverter switch in response to the said impulses.

9. The improved apparatus as defined in claim 8, wherein said power supply circuit of the motor incudes a voltage regulating circuit, and said means for operating said reel driving means at fast speed includes fast speed switch means for connecting said voltage regulating circuit in the power supply to said motor with said control element at its fast position or disconnecting said voltage regulating circuit from said motor and connecting a higher voltage to operate the motor at fast speed with said control element at its second position.

* * * * *

UNITED STATES PATENT OFFICE
CERTIFICATE OF CORRECTION

Patent No. 4,212,438            Dated July 15, 1980

Inventor(s) Etienne Arthur Marie Schatteman

Figure 6:
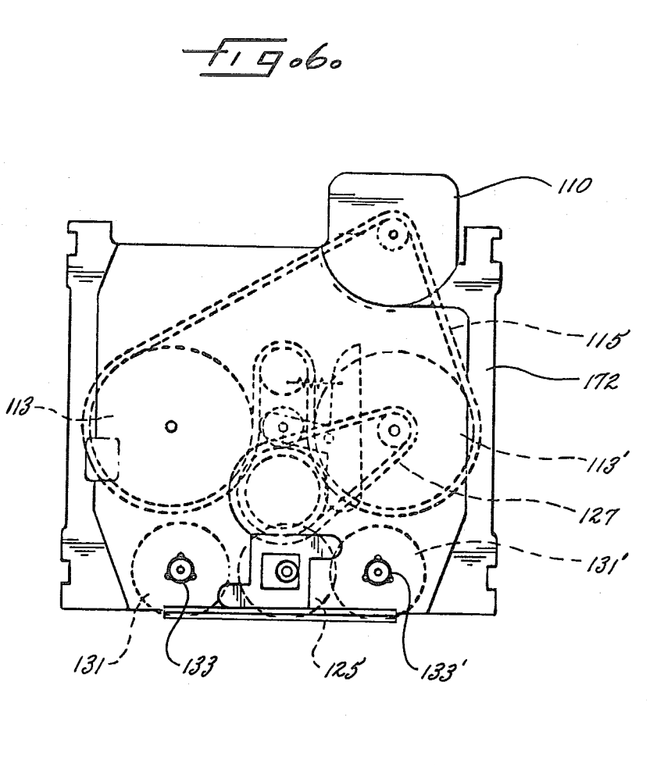
Figure 7:
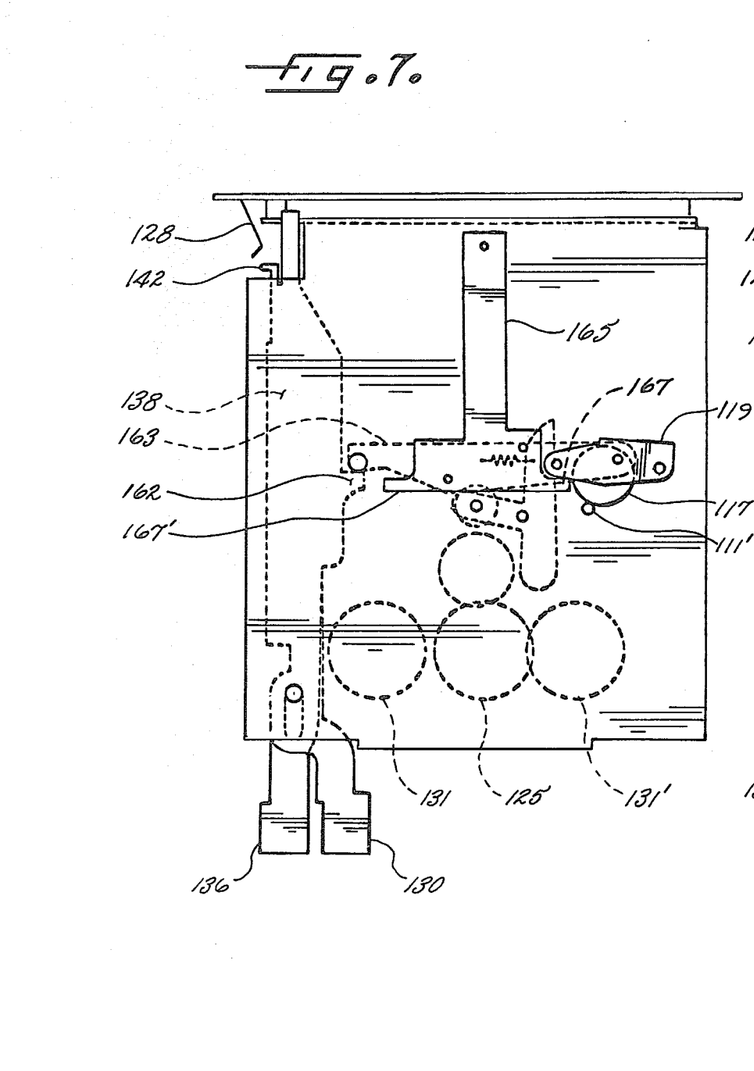
FIG. 7 is a plan view of the tape deck shown in FIG. 3 with certain components removed to reveal, in diagrammatic form, the mechanism for disengaging the capstan drive and engaging the direct drive to the reel spindles for fast speed functions.

It is certified that error appears in the above-identified patent and that said Letters Patent are hereby corrected as shown below:

Column 3, line 13, "Fig. 4" should be -- Fig. 6 --.

Claim 9, line 21, "incudes" should be -- includes --.

Signed and Sealed this

Fourth Day of November 1980

[SEAL]

Attest:

SIDNEY A. DIAMOND

Attesting Officer        Commissioner of Patents and Trademarks